(12) United States Patent
Koushik Bangalore Suryanarayana et al.

(10) Patent No.: US 11,100,367 B2
(45) Date of Patent: Aug. 24, 2021

(54) DYNAMIC DIGITAL INFORMATION RETRIEVAL IMPLEMENTED VIA ARTIFICIAL INTELLIGENCE

(71) Applicant: EMC IP Holding Company LLC, Hopkinton, MA (US)

(72) Inventors: Bharath Koushik Bangalore Suryanarayana, Bangalore (IN); Faizal Sn, Bengaluru (IN); Sathish Kumar Ponnusamy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 16/033,804

(22) Filed: Jul. 12, 2018

(65) Prior Publication Data

US 2020/0019819 A1 Jan. 16, 2020

(51) Int. Cl.
| | |
|---|---|
| *G06K 9/62* | (2006.01) |
| *G06T 7/73* | (2017.01) |
| *G06N 3/08* | (2006.01) |
| *G06K 9/00* | (2006.01) |
| *G06N 3/04* | (2006.01) |
| *G06K 9/46* | (2006.01) |

(52) U.S. Cl.
CPC ....... *G06K 9/6256* (2013.01); *G06K 9/00744* (2013.01); *G06N 3/08* (2013.01); *G06T 7/75* (2017.01); *G06T 2207/20081* (2013.01)

(58) Field of Classification Search
CPC ............. G06K 9/6256; G06K 9/00744; G06K 9/4652; G06K 9/4604; G06K 9/4661; G06T 7/75; G06T 2207/20081; G06N 3/08; G06N 3/0454
See application file for complete search history.

(56) References Cited

U.S. PATENT DOCUMENTS

| | | | |
|---|---|---|---|
| 9,317,753 B2 | 4/2016 | Saptharishi et al. | |
| 9,424,493 B2* | 8/2016 | He | G06K 9/6255 |
| 10,019,654 B1* | 7/2018 | Pisoni | G06N 3/084 |
| 10,445,569 B1* | 10/2019 | Lin | G06F 40/279 |
| 2011/0268369 A1* | 11/2011 | Richards | G06T 7/97 |
| | | | 382/284 |

(Continued)

*Primary Examiner* — Asghar H Bilgrami
(74) *Attorney, Agent, or Firm* — Ryan, Mason & Lewis, LLP

(57) ABSTRACT

Methods, apparatus, and processor-readable storage media for dynamic digital information retrieval are provided herein. An example computer-implemented method includes training a machine learning object detection model using server component images and one or more features of the server component images; determining a type of server device captured by at least one camera-derived input, wherein determining the type of server device comprises analyzing the at least one camera-derived input using the machine learning object detection model; identifying one or more server components captured by the at least one camera-derived input by analyzing, within a context of the determined type of server device, the at least one camera-derived input using the machine learning object detection model; and outputting, to at least one display, information pertaining to the identified server components, wherein the information is retrieved from a data source related to the determined type of server device.

20 Claims, 7 Drawing Sheets

(56) References Cited

U.S. PATENT DOCUMENTS

| | | | |
|---|---|---|---|
| 2013/0124518 A1 | 5/2013 | Ikenoue et al. | |
| 2015/0125042 A1* | 5/2015 | Haden | G06K 9/00771 |
| | | | 382/105 |
| 2017/0352143 A1* | 12/2017 | Kompalli | G06T 7/0002 |
| 2018/0150791 A1* | 5/2018 | Stansell | G06T 7/50 |
| 2018/0157932 A1* | 6/2018 | Gu | G06K 9/6227 |
| 2018/0365278 A1* | 12/2018 | Klohn | G06F 16/51 |
| 2019/0019052 A1* | 1/2019 | Pao | G06K 9/3258 |
| 2019/0130292 A1* | 5/2019 | N | G06T 7/75 |
| 2019/0215424 A1* | 7/2019 | Adato | G06F 16/5846 |
| 2019/0279293 A1* | 9/2019 | Tang | G06N 3/0454 |
| 2019/0291277 A1* | 9/2019 | Oleynik | B25J 9/163 |
| 2019/0340459 A1* | 11/2019 | Faibish | G06N 20/00 |

* cited by examiner

DYNAMIC DIGITAL INFORMATION RETRIEVAL IMPLEMENTED VIA ARTIFICIAL INTELLIGENCE

FIELD

The field relates generally to information processing systems, and more particularly to techniques for information retrieval in such systems.

BACKGROUND

Typically, when a server is sold, the vendor will also provide a hardware or owner's manual along with the server. Such a manual commonly helps the technician with various tasks such as initial hardware setup and troubleshooting. For example, for an initial setup task, the user (such as an engineer or a datacenter administrator) commonly needs to refer to the manual either by using a hard copy or referring to the manual online by searching for a support web site online and navigating the online manual in an attempt to locate relevant content.

However, providing hard copies of manuals involves costs and efforts related to printing and shipping. Also, printing errors can result in configuration errors, delays, and diminished user experiences. Further, with respect to using both hard copy manuals and support website-based manuals, locating various server components and matching those components to appropriate portions of the manual can often be time-consuming and prone to errors.

SUMMARY

Illustrative embodiments of the invention provide dynamic digital information retrieval implemented via artificial intelligence. An example computer-implemented method can include training a machine learning object detection model using multiple server component images and one or more features of the multiple server component images. Additionally, such a method can include determining a type of server device captured by at least one camera-derived input, wherein determining the type of server device comprises analyzing the at least one camera-derived input using the machine learning object detection model. Such a method can also include identifying one or more server components captured by the at least one camera-derived input by analyzing, within a context of the determined type of server device, the at least one camera-derived input using the machine learning object detection model. Further, such a method can include outputting, to at least one display, information pertaining to the one or more identified server components, wherein the information is retrieved from at least a portion of a data source related to the determined type of server device.

Illustrative embodiments can provide significant advantages relative to conventional hard copy manuals and support website-based manuals. For example, challenges associated with the limitations of static hard copy manuals are overcome through the use of dynamic digital manuals by precluding the need to print and ship large numbers of physical documents. Such dynamic digital manuals also overcome challenges associated with hard copy and website-based manuals by enabling dynamic component look-up capabilities, precluding the need for time-consuming searching and side-by-side comparisons.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
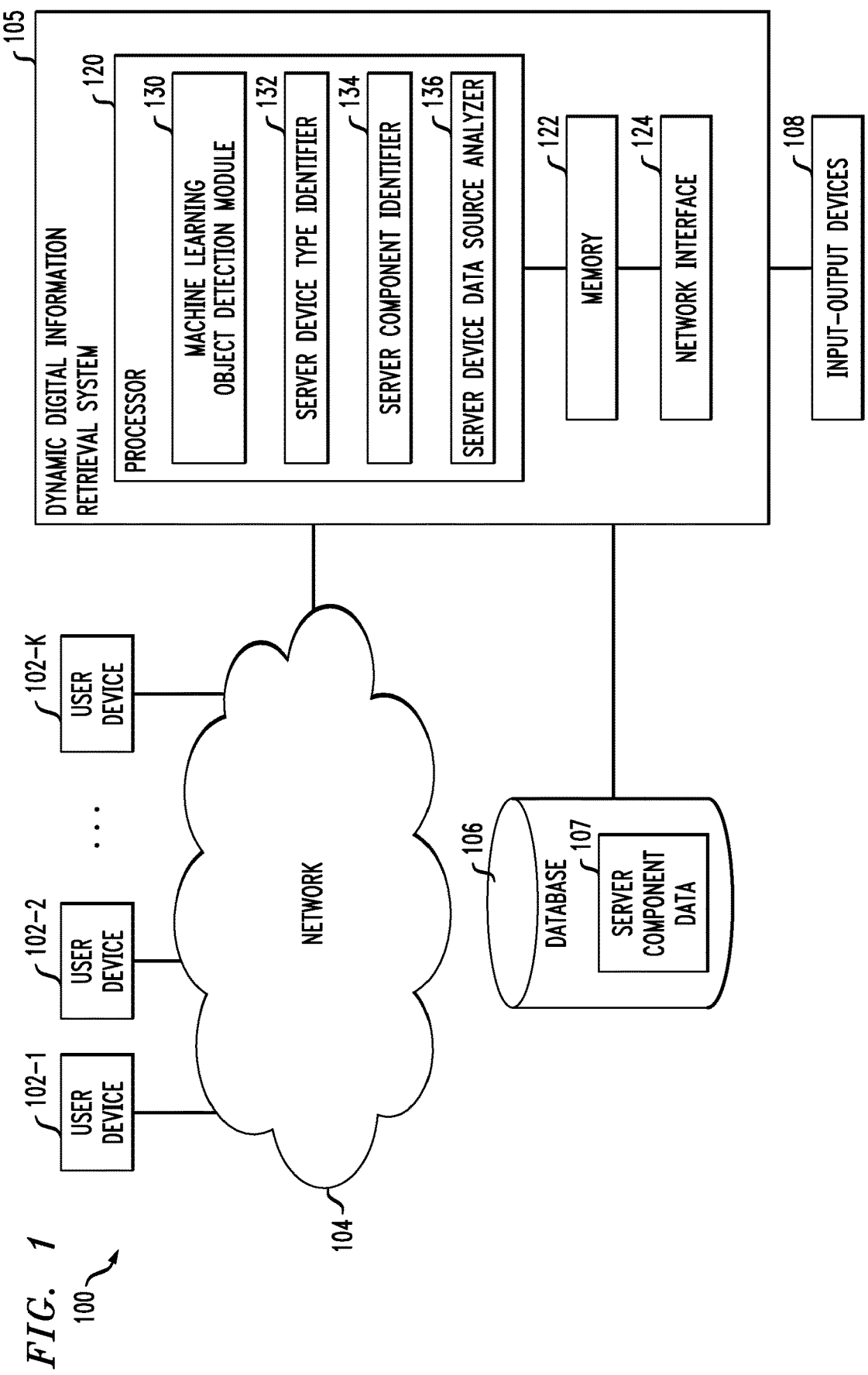
FIG. 1 shows an information processing system configured for dynamic digital information retrieval in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a dynamic digital information retrieval system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The dynamic digital information retrieval system 105 has an associated database 106 configured to store server component data 107, which illustratively comprise information pertaining to multiple server components across multiple server models.

The database 106 in the present embodiment is implemented using one or more storage systems associated with the dynamic digital information retrieval system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dynamic digital information retrieval system 105 are input-output devices 108, which illustratively comprise keyboards, displays or other types of input-output devices in any combination. Such input-output devices are used to support one or more user interfaces to the dynamic digital information retrieval system 105, as well as to support communication between the dynamic digital information retrieval system 105 and other related systems and devices not explicitly shown.

The dynamic digital information retrieval system 105 in the FIG. 1 embodiment is assumed to be implemented using at least one processing device. Each such processing device generally comprises at least one processor and an associated memory, and implements one or more functional modules for controlling certain features of the dynamic digital information retrieval system 105.

More particularly, the dynamic digital information retrieval system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the dynamic digital information retrieval system 105 to communicate over the network 104 with the user devices 102, and illustratively comprises one or more conventional transceivers.

The processor 120 further comprises a machine learning object detection model 130, a server device type identifier 132, a server component identifier 134 and a server device data source analyzer 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the machine learning object detection model 130, server device type identifier 132, server component identifier 134 and server device data source analyzer 136 may be implemented at least in part in the form of software that is stored in memory 122 and executed by processor 120.

It is to be understood that the particular set of elements shown in FIG. 1 for dynamic digital information retrieval involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the dynamic digital information retrieval system 105 can be eliminated and associated elements such as machine learning object detection model 130, server device type identifier 132, server component identifier 134 and server device data source analyzer 136 can be implemented elsewhere in the computer network 100.

An exemplary process utilizing machine learning object detection model 130, server device type identifier 132, server component identifier 134 and server device data source analyzer 136 of the dynamic digital information retrieval system 105 in computer network 100 will be described in more detail with reference to the flow diagram of FIG. 6.

As detailed herein, at least one embodiment of the invention includes dynamically identifying server components from video and/or image input (live and/or static video or image input) and displaying the identified components and related information (such as from a manual, for example) through an interface. Such an embodiment can be implemented via a software application of a mobile device. Additionally, such a software application can utilize the camera interface of a mobile device to capture the input(s), and artificial intelligence (AI) to dynamically detect server hardware types and various components thereof. For example, after the software application is launched on a mobile device, and the camera of the mobile device is focused on at least a portion of a server, the software application can dynamically identify (based on the captured video and/or image data) the server type as well as identify and classify one or more components of the server, along with digital information (derived, for example, from a relevant manual) related to the server type and/or identified components. Accordingly, by way of example, a user can walk through multiple server components via the software application using the camera interface of the user's mobile device, and dynamically receive details pertaining to the captured components on the mobile device screen.

As further detailed herein, identification of server type and server components is achieved through implementation of a CNN, such as, for example, a faster region-based CNN (Faster R-CNN) algorithm. As used herein, with respect to a conventional R-CNN, implementing a training model takes more time, as compared to a Faster R-CNN, because of higher iterations in finalizing the region of interest. With a Faster R-CNN, a convolutional neural network algorithm can be run over the input image for purposes of identifying a region proposed network, as further detailed herein.

Accordingly, in one or more embodiments of the invention, a Faster R-CNN algorithm is implemented to perform feature extraction over an image or video input, wherein such features can include component color, component scaling, component rotation/orientation, component illumination, component edge detail, etc. Based on the feature extraction, the Faster R-CNN algorithm can determine and/or suggest one or more regions and/or components contained within the image or video input.

Figure 2:
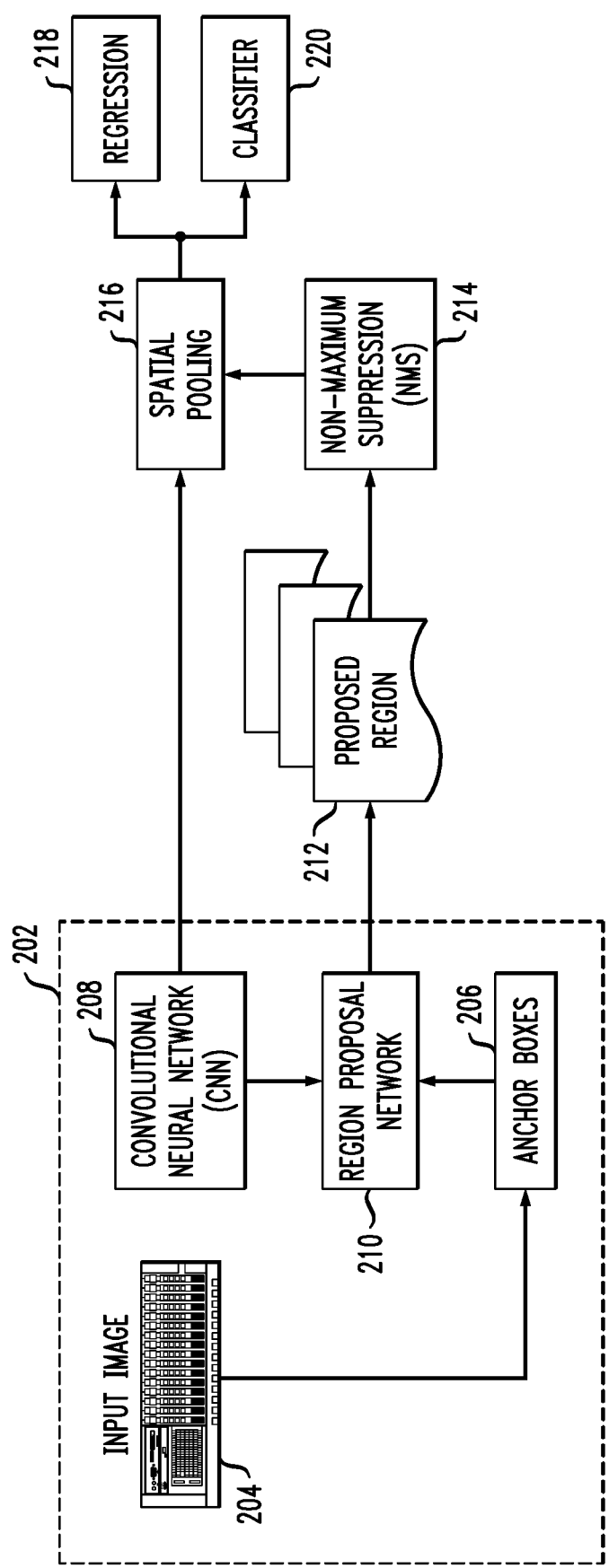
FIG. 2 shows a workflow for implementing an object detection model in an illustrative embodiment.

FIG. 2 shows a workflow for implementing an object detection model 202 in an illustrative embodiment. By way of illustration, FIG. 2 depicts the object detection model 202, which processes an input image 204 using one or more anchor boxes 206. Output from this analysis by the anchor boxes 206, in addition to input from a CNN 208 (which can be pre-trained on image classification tasks), is provided to a region proposal network 210. Such inputs can serve to fine-tune the region proposal network 210 for a region proposal task (with respect to the input image 204), wherein this region proposal task is initialized by the input from the pre-trained CNN 208.

Accordingly, the region proposal network 210 ultimately generates and outputs a proposed region 212. A non-maximum suppression (NMS) algorithm 214 is applied to the proposed region, and the output of this algorithm (that is, identification of the image with maximum image or object coverage from the proposed region(s)) is provided as input (along with input from the CNN 208) to a spatial pooling algorithm 216. The output of the spatial pooling algorithm (that is, recognition of an object despite substantial spatial distortions (such as rotation, different angle, size, etc.), making object recognition more robust) is then provided to a regression algorithm 218 and a classifier algorithm 220, resulting in an identification of one or more server components (from the input image 204). The regression algorithm 218 helps in extracting the closer coordinates of the identified object, while the classifier/classification algorithm 220 classifies the object in the region(s) that has been processed thus far.

Figure 3:
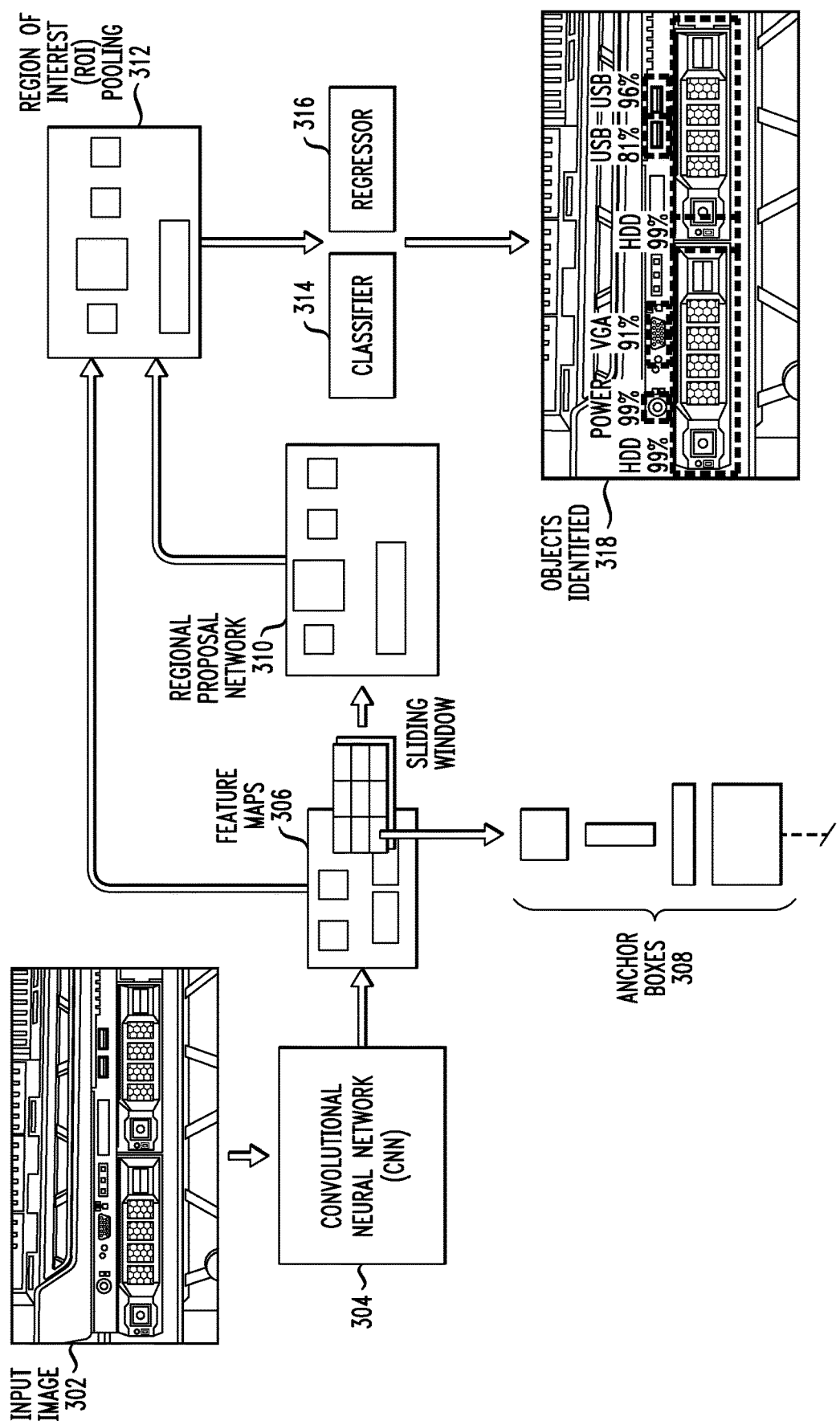
FIG. 3 shows a flow diagram of a process for detecting one or more server components using a convolutional neural network (CNN) in an illustrative embodiment.

FIG. 3 shows a flow diagram of a process for detecting one or more server components using a CNN in an illustrative embodiment. By way of illustration, FIG. 3 depicts an input image 302, which is processed by CNN 304. In one or more embodiments of the invention, processes being carried out by the CNN 304 can include positioning an n×n spatial/sliding window over one or more convolutional feature maps 306 of the entire input image 302. For example, in at least one embodiment of the invention, the CNN algorithm generates convolutional feature maps by scanning the entire input image. In this scanning process, the CNN algorithm searches for specific image properties such as curves, circles, edges, etc., and these image properties can correspond to a high probability of locating the object in the input image.

Additionally, the size of an n×n spatial/sliding window can be a user-configurable parameter used by the algorithm. At the center of each sliding window, predictions of multiple regions of various scales and ratios can be made simultaneously. Various sizes of anchor boxes 308 can be proposed with respect to the center of each sliding window, and these anchor boxes 308 correspond to different sizes and aspect ratios. Moreover, in one or more embodiments of the invention, each anchor box represents a combination of a sliding window center, a scale, and a ratio, which constitute a particular shape. For example, three scales and three ratios can lead to nine anchor boxes at each sliding position. As such, utilization of the anchor boxes 308 can, for example, improve handling of the same object with different sizes and aspect ratios.

As also depicted in FIG. 3, the output generated by the feature maps 306 is used by a regional proposal network 310, which determines one or more regions from the input image 302, and provides such proposed regions to a region of interest (ROI) pooling algorithm 312 (which also receives input from the feature maps 306). The output from the ROI pooling algorithm 312 (that is, collation of the exact location of an object from the proposed region(s)) is provided to a classifier algorithm 314 and a regressor algorithm 316, which generate a determination of one or more identified objects 318 from the input image 302. Additionally, one or more embodiments of the invention can also include determining and displaying a confidence value (such as a percentage value between zero and 100) attributed to the identification of each object in output 318.

In at least one embodiment of the invention, a Faster R-CNN object detection model (such as CNN 304 in FIG. 3) can be trained using proposals generated by a regional proposal network (such as network 310 in FIG. 3). Subsequently, such an embodiment can include using the trained Faster R-CNN model to initialize regional proposal network training. While maintaining shared convolutional layers among the object detection model and the regional proposal network, one or more embodiments of the invention can include separately fine-tuning the regional proposal network-specific layers and the unique layers of the Faster R-CNN object detection model. The fine-tuning can be carried out, for example, based on the object properties in the images (such as edges, curves, circles, etc.), and also using the corresponding anchor's aspect ratios, size, angle, etc.

Figure 4:
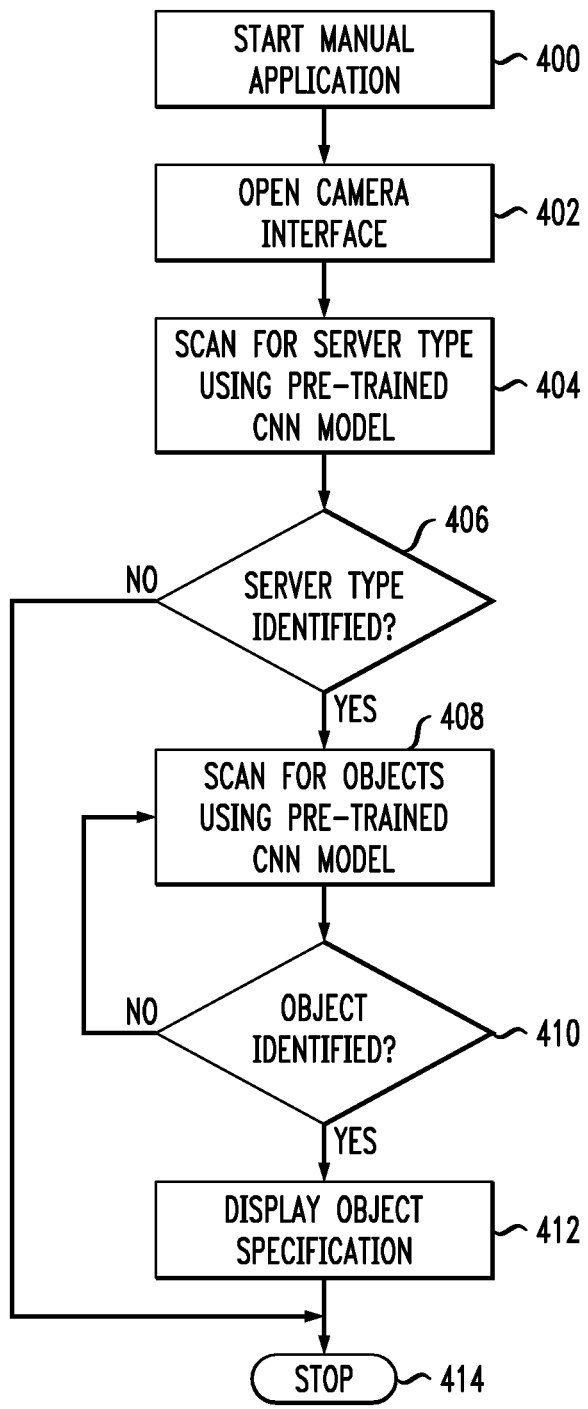
FIG. 4 shows a flow diagram of a process for displaying an object specification in connection with an object detection in an illustrative embodiment.

FIG. 4 shows a flow diagram of a process for displaying an object specification in connection with an object detection in an illustrative embodiment. Step 400 includes starting/opening the mobile object detection software application on a user's mobile device. Step 402 includes opening the camera interface on the mobile device and capturing an image or video input of server hardware and/or a server device. Step 404 includes scanning the captured input to attempt to determine a server type using a pre-trained CNN model, and step 406 includes determining whether a server type can be identified. If no (that is, no server type can be identified), then the process ends via step 414. If yes (that is, a server type can be identified), then the process continues to step 408, which includes scanning the captured input to attempt to identify one or more objects (such as server components) using the pre-trained CNN model.

Step 410 includes determining whether one or more objects can be identified. If no (that is, no objects can be identified in the image or video input), then the process returns to step 408. If yes (that is, one or more objects are identified in the input), then the process continues to step 412, which includes retrieving and displaying (via the interface of the mobile device) specification information pertaining to the identified object(s). The process subsequently ends at step 414.

Figure 5:
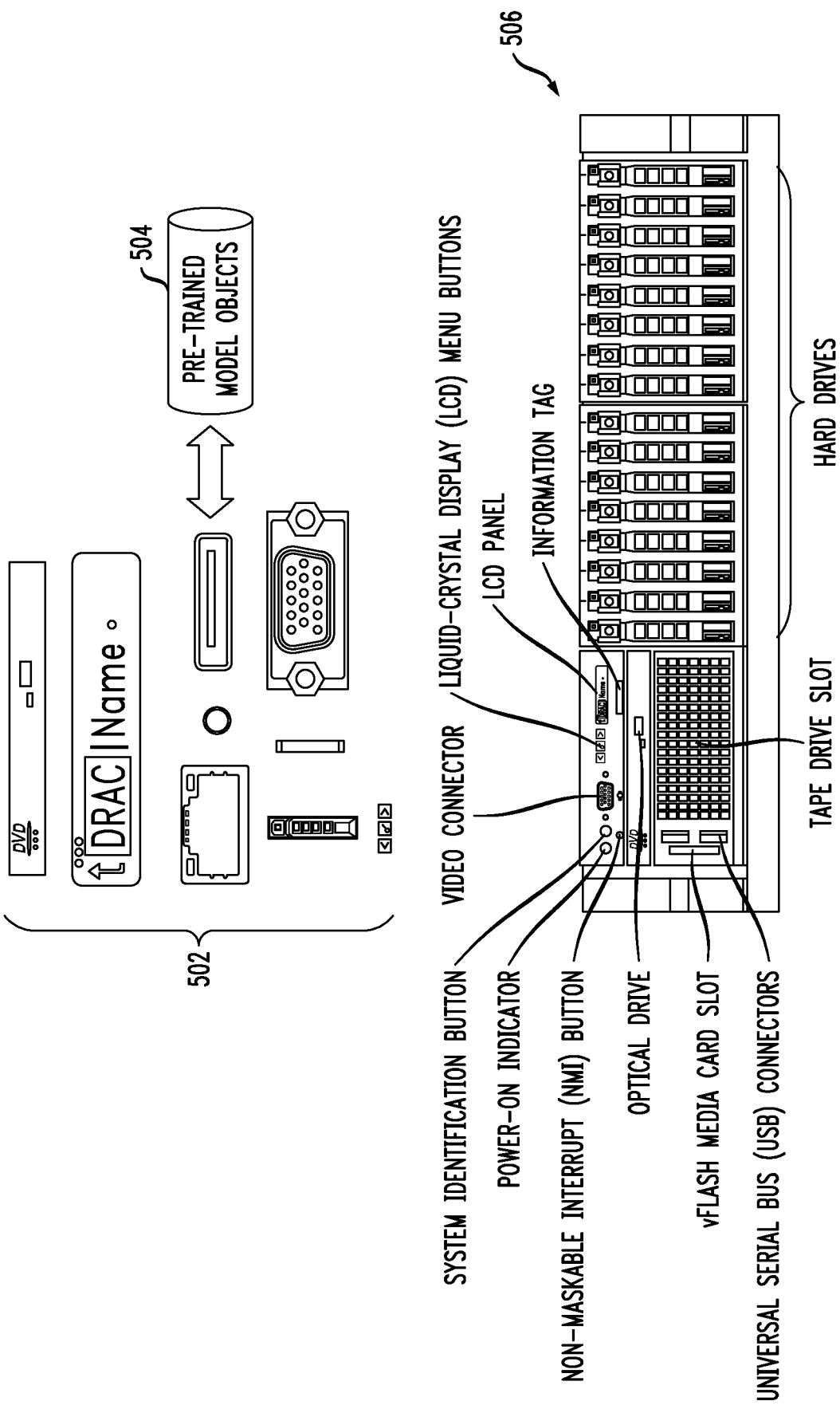
FIG. 5 shows an example of object detection after model analysis in an illustrative embodiment.

FIG. 5 shows an example of object detection after model analysis in an illustrative embodiment. By way of illustration, FIG. 5 depicts a variety of images of individual server components 502, which are compared to a pre-trained model 504 of objects for purposes of identification. For example, identification of server components 506 can include components such as a system identification button, a power-on indicator, a non-maskable interrupt (NMI) button, an optical drive, a vFlash media card slot, universal serial bus (USB) connectors, a video connector, liquid-crystal display (LCD) menu buttons, an LCD panel, an information tag, a tape drive slot, one or more hard drives, etc.

Figure 6:
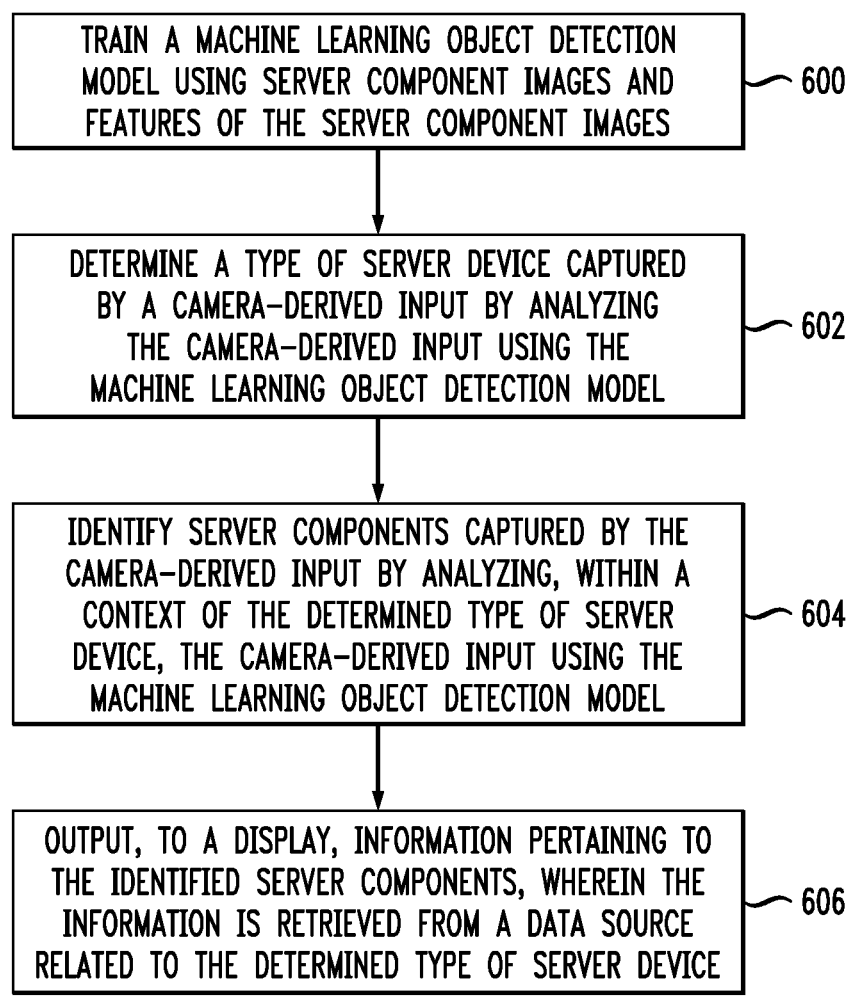
FIG. 6 is a flow diagram of a process for dynamic digital information retrieval in an illustrative embodiment.

FIG. 6 is a flow diagram of a process for dynamically detecting server components and displaying data source specification corresponding thereto in an illustrative embodiment. It is to be understood that this particular process is only an example, and additional or alternative processes can be carried out in other embodiments. In this embodiment, the process includes steps 600 through 606. These steps are assumed to be performed by the processor 120 utilizing its modules 130, 132, 134 and 136.

Step 600 includes training a machine learning object detection model using multiple server component images and one or more features of the multiple server component images. The machine learning object detection model can include a region-based convolutional neural network model (such as, for example, a faster-CNN model). Additionally, the one or more features of the multiple server component images can include component color, component scale, component orientation, component edge detail, and/or component illumination.

Step 602 includes determining a type of server device captured by at least one camera-derived input, wherein determining the type of server device comprises analyzing the at least one camera-derived input using the machine learning object detection model. The at least one camera-derived input can include a live video input, a stored video input, a new image input, and/or a stored image input.

Step 604 includes identifying one or more server components captured by the at least one camera-derived input by analyzing, within a context of the determined type of server device, the at least one camera-derived input using the machine learning object detection model. As detailed herein, the one or more server components can include at least one of a port, a slot, a switch, a power indicator, an information tag, a drive, a panel, a disk, and a connector. Also, identifying the one or more server components can include performing, via the machine learning object detection model, feature extraction over the at least one camera-derived input. Performing the feature extraction can include extracting, from the at least one camera-derived input, one or more component features comprising component color, component scale, component orientation, component edge detail, and/or component illumination. Additionally, identifying the one or more server components can also include determining, based at least in part on the feature extraction, one or more regions of the determined type of server device captured by the at least one camera-derived input.

Step 606 includes outputting, to at least one display, information pertaining to the one or more identified server components, wherein the information is retrieved from at least a portion of a data source related to the determined type of server device. Outputting the information pertaining to the one or more identified server components can include displaying the information via an interface of a mobile device, wherein the mobile device captured the at least one camera-derived input.

Further, in one or more embodiments of the invention, step 600, step 602, step 604 and step 606 can be performed by a software application executing on at least one processing device, wherein the at least one processing device comprises a mobile device.

Accordingly, the particular processing operations and other network functionality described in conjunction with the flow diagram of FIG. 6 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to provide efficiencies and environmental benefits by precluding the need to print and ship large numbers of physical documents. Additionally, these and other embodiments can enable dynamic component look-up capabilities, precluding the need for time-consuming searching and side-by-side comparisons.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
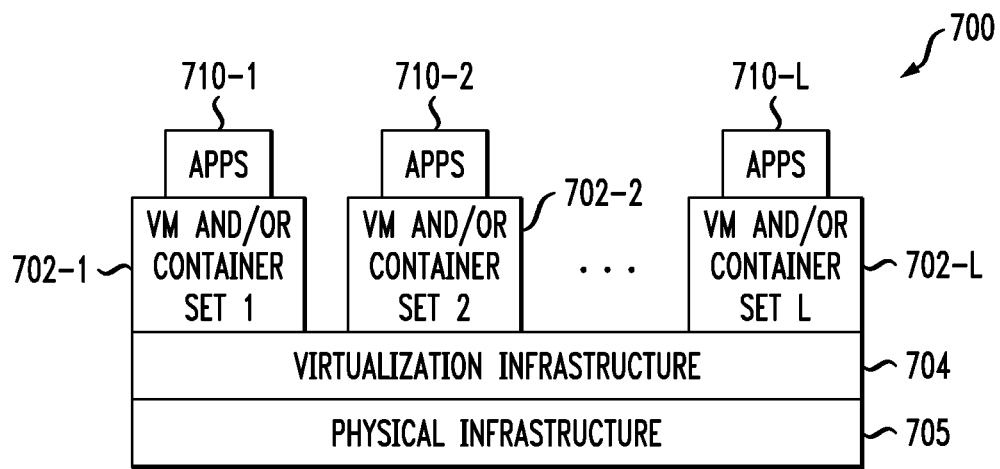
FIGS. 7 and 8 show examples of processing platforms that may be utilized to implement at least a portion of an information processing system in illustrative embodiments.
Figure 8:
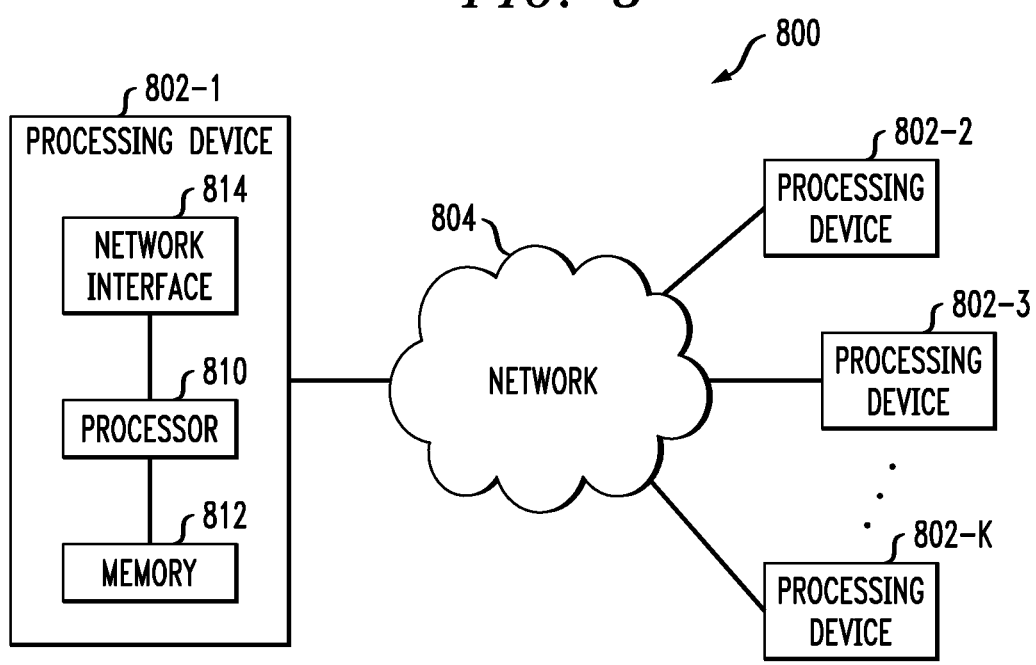

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide dynamic digital information retrieval. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A computer-implemented method comprising:
training a machine learning object detection model using multiple server component images and one or more features of the multiple server component images;
determining a type of server device captured by at least one camera-derived input, wherein determining the type of server device comprises analyzing the at least one camera-derived input using the machine learning object detection model;
identifying one or more server components captured by the at least one camera-derived input by analyzing, within a context of the determined type of server device, the at least one camera-derived input, wherein identifying the one or more server components comprises:
identifying at least one region of the camera-derived input associated with the one or more server components by processing at least a portion of the at least one camera-derived input using the machine learning object detection model;
identifying one or more portions of the at least one identified region comprising at least a given amount of component coverage by processing the at least one identified region using at least one non-maximum suppression algorithm;
performing component recognition by processing the one or more identified portions using at least one spatial pooling algorithm; and
classifying the one or more server components by processing results of the component recognition using at least one classifier algorithm; and
outputting, to at least one display, information pertaining to the one or more identified server components, wherein the information is retrieved from at least a portion of a data source related to the determined type of server device, wherein the at least a portion of a data source related to the determined type of server device comprises at least a portion of at least one hardware manual, and wherein the at least a portion of the at least one hardware manual comprises one or more portions pertaining to the one or more identified server components of the determined type of server device;
wherein the method is performed by at least one processing device comprising a processor coupled to a memory.

2. The computer-implemented method of claim 1, wherein the machine learning object detection model comprises a region-based convolutional neural network model.

3. The computer-implemented method of claim 1, wherein the one or more features of the multiple server component images comprises component color.

4. The computer-implemented method of claim 1, wherein the one or more features of the multiple server component images comprises component scale.

5. The computer-implemented method of claim 1, wherein the one or more features of the multiple server component images comprises component orientation.

6. The computer-implemented method of claim 1, wherein the one or more features of the multiple server component images comprises component edge detail.

7. The computer-implemented method of claim 1, wherein the one or more features of the multiple server component images comprises component illumination.

8. The computer-implemented method of claim 1, wherein the at least one camera-derived input comprises at least one of a live video input, a stored video input, a new image input, and a stored image input.

9. The computer-implemented method of claim 1, wherein the one or more server components comprises at least one of a port, a slot, a switch, a power indicator, an information tag, a drive, a panel, a disk, and a connector.

10. The computer-implemented method of claim 1, wherein identifying the one or more server components comprises performing, via the machine learning object detection model, feature extraction over the at least one camera-derived input.

11. The computer-implemented method of claim 10, wherein performing the feature extraction comprises extracting, from the at least one camera-derived input, one or more component features comprising at least one of component color, component scale, component orientation, component edge detail, and component illumination.

12. The computer-implemented method of claim 10, wherein identifying the one or more server components comprises determining, based at least in part on the feature extraction, one or more regions of the determined type of server device captured by the at least one camera-derived input.

13. The computer-implemented method of claim 1, wherein outputting the information pertaining to the one or more identified server components comprises displaying the information via an interface of a mobile device, wherein the mobile device captured the at least one camera-derived input.

14. The computer-implemented method of claim 1, wherein the steps are performed by a software application executing on the at least one processing device, wherein the at least one processing device comprises a mobile device.

15. A non-transitory processor-readable storage medium having stored therein program code of one or more software programs, wherein the program code when executed by at least one processing device causes said at least one processing device:
to train a machine learning object detection model using multiple server component images and one or more features of the multiple server component images;
to determine a type of server device captured by at least one camera-derived input, wherein determining the type of server device comprises analyzing the at least one camera-derived input using the machine learning object detection model;
to identify one or more server components captured by the at least one camera-derived input by analyzing, within a context of the determined type of server device, the at least one camera-derived input, wherein identifying the one or more server components comprises:
identifying at least one region of the camera-derived input associated with the one or more server components by processing at least a portion of the at least one camera-derived input using the machine learning object detection model;
identifying one or more portions of the at least one identified region comprising at least a given amount of component coverage by processing the at least one identified region using at least one non-maximum suppression algorithm;
performing component recognition by processing the one or more identified portions using at least one spatial pooling algorithm; and
classifying the one or more server components by processing results of the component recognition using at least one classifier algorithm; and
to output, to at least one display, information pertaining to the one or more identified server components, wherein the information is retrieved from at least a portion of a data source related to the determined type of server device, wherein the at least a portion of a data source related to the determined type of server device comprises at least a portion of at least one hardware manual, and wherein the at least a portion of the at least one hardware manual comprises one or more portions pertaining to the one or more identified server components of the determined type of server device.

16. The non-transitory processor-readable storage medium of claim 15, wherein the machine learning object detection model comprises a region-based convolutional neural network model.

17. The non-transitory processor-readable storage medium of claim 15, wherein identifying the one or more server components comprises performing, via the machine learning object detection model, feature extraction over the at least one camera-derived input.

18. An apparatus comprising:
at least one processing device comprising a processor coupled to a memory;
said at least one processing device being configured:
to train a machine learning object detection model using multiple server component images and one or more features of the multiple server component images;
to determine a type of server device captured by at least one camera-derived input, wherein determining the type of server device comprises analyzing the at least one camera-derived input using the machine learning object detection model;
to identify one or more server components captured by the at least one camera-derived input by analyzing, within a context of the determined type of server device, the at least one camera-derived input, wherein identifying the one or more server components comprises:
identifying at least one region of the camera-derived input associated with the one or more server components by processing at least a portion of the at least one camera-derived input using the machine learning object detection model;
identifying one or more portions of the at least one identified region comprising at least a given amount of component coverage by processing the at least one identified region using at least one non-maximum suppression algorithm;

performing component recognition by processing the one or more identified portions using at least one spatial pooling algorithm; and classifying the one or more server components by processing results of the component recognition using at least one classifier algorithm; and to output, to at least one display, information pertaining to the one or more identified server components, wherein the information is retrieved from at least a portion of a data source related to the determined type of server device, wherein the at least a portion of a data source related to the determined type of server device comprises at least a portion of at least one hardware manual, and wherein the at least a portion of the at least one hardware manual comprises one or more portions pertaining to the one or more identified server components of the determined type of server device.

19. The apparatus of claim 18, wherein the machine learning object detection model comprises a region-based convolutional neural network model.

20. The apparatus of claim 18, wherein identifying the one or more server components comprises performing, via the machine learning object detection model, feature extraction over the at least one camera-derived input.

* * * * *